US010031572B2

(12) United States Patent
Chen

(10) Patent No.: US 10,031,572 B2
(45) Date of Patent: Jul. 24, 2018

(54) METHOD AND DEVICE FOR PROCESSING CORE OF PROCESSOR, AND TERMINAL

(71) Applicant: ZTE CORPORATION, Shenzhen, Guangdong Province (CN)

(72) Inventor: Tianming Chen, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 50 days.

(21) Appl. No.: 14/917,351

(22) PCT Filed: Oct. 14, 2013

(86) PCT No.: PCT/CN2013/085181
§ 371 (c)(1),
(2) Date: Mar. 8, 2016

(87) PCT Pub. No.: WO2014/169596
PCT Pub. Date: Oct. 23, 2014

(65) Prior Publication Data
US 2016/0224100 A1 Aug. 4, 2016

(30) Foreign Application Priority Data
Sep. 9, 2013 (CN) .......................... 2013 1 0407868

(51) Int. Cl.
G06F 1/32 (2006.01)
G06F 1/26 (2006.01)
G06F 9/50 (2006.01)

(52) U.S. Cl.
CPC .......... G06F 1/3287 (2013.01); G06F 1/3228 (2013.01); G06F 1/3243 (2013.01);
(Continued)

(58) Field of Classification Search
CPC ..................................... G06F 1/26; G06F 1/32
See application file for complete search history.

(56) References Cited

U.S. PATENT DOCUMENTS 8,490,103 B1* 7/2013 Belady ................. G06F 1/3243
713/300
2005/0283679 A1* 12/2005 Heller, Jr. ................ G06F 1/32
714/39

(Continued)

FOREIGN PATENT DOCUMENTS

CN 103077087 A 5/2013
EP 2568354 A1 3/2013

OTHER PUBLICATIONS

International Search Report (Form PCT/ISA/210) for International Application No. PCT/CN2013/085181 dated Jun. 30, 2014.

Primary Examiner — Phil Nguyen
(74) Attorney, Agent, or Firm — Koppel, Patrick, Heybl, & Philpott

(57) ABSTRACT

Provided are a method and device for processing a core of a processor, and a terminal. The method comprises that: a current utilization rate of the processor is acquired; and the number of currently-running cores of the processor is processed according to the acquired utilization rate. By means of the present disclosure, the problems of high device power consumption, high electric energy consumption, poor heat dissipation and the like in the related art are solved, thereby achieving the effects of improving the utilization rate of the processor, lowering power consumption and improving user experience.

7 Claims, 6 Drawing Sheets

(52) U.S. Cl.
CPC .......... *G06F 9/5094* (2013.01); *Y02D 10/152* (2018.01); *Y02D 10/171* (2018.01); *Y02D 10/22* (2018.01)

(56) References Cited

U.S. PATENT DOCUMENTS

| | | | | |
|---|---|---|---|---|
| 2007/0033425 A1* | 2/2007 | Clark | .................... | G06F 1/3203 713/320 |
| 2009/0328055 A1* | 12/2009 | Bose | .................... | G06F 1/3203 718/105 |
| 2010/0107166 A1* | 4/2010 | Topaloglu | ............ | G06F 9/5094 718/102 |
| 2010/0332869 A1* | 12/2010 | Hsin | .................... | G06F 1/3203 713/320 |
| 2012/0079290 A1* | 3/2012 | Kumar | ...................... | G06F 1/26 713/300 |
| 2012/0144217 A1* | 6/2012 | Sistla | ................... | G06F 1/3228 713/320 |
| 2012/0272241 A1* | 10/2012 | Nonaka | ................. | G06F 9/5077 718/1 |
| 2012/0324250 A1* | 12/2012 | Chakraborty | ........... | G06F 1/206 713/300 |
| 2013/0030785 A1* | 1/2013 | Satterfield | .............. | G06Q 10/06 703/21 |
| 2014/0047151 A1* | 2/2014 | Feehrer | .................. | G06F 13/24 710/267 |
| 2014/0100706 A1* | 4/2014 | Khatri | .................. | G06F 1/3206 700/297 |
| 2014/0101411 A1* | 4/2014 | Sakarda | ............... | G06F 9/3885 712/42 |

\* cited by examiner

METHOD AND DEVICE FOR PROCESSING CORE OF PROCESSOR, AND TERMINAL

TECHNICAL FIELD

The present disclosure relates to the field of communications, and in particular to a method and device for processing a core of a processor, and a terminal.

BACKGROUND

Recently, with the high-speed development of an electronic chip, a Graphics Processing Unit (GPU) technology is rapidly developed, the internal integration of a GPU is increasingly complicated, the number of cores is much larger, and a Three-dimensional (3D) processing effect is increasingly gorgeous. The most important measurement index of a current terminal device is to create better user experience in which a 3D effect is primary, so it is quite necessary to use a high-performance multi-core GPU. Thus, high-performance experience is brought, and lots of problems that power consumption is increased, heat dissipation is poor and a high-capacity mobile battery is needed are caused accordingly. All device manufacturers are intended to solve the problem how to lower the power consumption of a mobile terminal device, and an unnecessary measure of installing the high-capacity mobile battery should be taken. How to lower the power consumption of the device is a problem that always puzzles the mobile terminal device. Due to the usage of the multi-core GPU, the electric energy consumption of the device is increased consequentially.

Thus, there are problems of high device power consumption, high electric energy consumption, poor heat dissipation and the like in the related art.

SUMMARY

The present disclosure provides a method and device for processing a core of a processor and a terminal, which are intended to at least solve the problems of high device power consumption, high electric energy consumption, poor heat dissipation and the like in the related art.

According to one aspect of the present disclosure, a method for processing a core of a processor is provided, comprising: acquiring a current utilization rate of the processor; and processing the number of currently-running cores of the processor according to the acquired utilization rate.

In an example embodiment, acquiring the current utilization rate of the processor comprises: recording working duration of the processor within predetermined sampling duration; and determining a ratio of the working duration to the sampling duration as the current utilization rate.

In an example embodiment, processing the number of the currently-running cores of the processor according to the acquired utilization rate comprises: determining a predetermined corresponding relationship between a utilization rate and the number of running cores of the processor; determining the corresponding number of the currently-running cores of the processor according to the predetermined corresponding relationship, wherein the corresponding number of the currently-running cores of the processor corresponds to the acquired utilization rate according to the predetermined corresponding relationship; and opening or closing a core of the processor according to the determined corresponding number of the currently-running cores of the processor.

In an example embodiment, determining the predetermined corresponding relationship between the utilization rate and the number of the running cores of the processor comprises: determining the number of divided areas of a utilization rate of the processor according to the number of cores of the processor; and determining the number of running cores, corresponding to each divided area, of the processor.

In an example embodiment, processing the number of the currently-running cores of the processor according to the acquired utilization rate comprises: judging whether the acquired utilization rate of the processor is within a predetermined utilization rate range corresponding to the number of the currently-running cores; and executing, according to a judgment result, at least one of following operations: keeping the number of the currently-running cores unchanged when the judgment result is that the acquired utilization rate of the processor is within the predetermined utilization rate range; closing at least one currently-working core on a premise of ensuring that at least one core works, when the judgment result is that the acquired utilization rate of the processor is not within the predetermined utilization rate range and the acquired utilization rate is lower than a lower limit of the predetermined utilization rate range; and opening at least one currently-idle core when the judgment result is that the acquired utilization rate of the processor is not within the predetermined utilization rate range and the acquired utilization rate is higher than an upper limit of the predetermined utilization rate range.

According to another aspect of the embodiment of the present disclosure, a device for processing a core of a processor is provided, comprising: an acquiring component, configured to acquire a current utilization rate of the processor; and a processing component, configured to process the number of currently-running cores of the processor according to the acquired utilization rate.

In an example embodiment, the acquiring component comprises: a recording element, configured to record working duration of the processor within predetermined sampling duration; and a first determining element, configured to determine a ratio of the working duration to the sampling duration as the current utilization rate.

In an example embodiment, the processing component comprises: a second determining element, configured to determine a predetermined corresponding relationship between a utilization rate and the number of running cores of the processor; a third determining element, configured to determine the corresponding number of the currently-running cores of the processor according to the predetermined corresponding relationship, wherein the corresponding number of the currently-running cores of the processor corresponds to the acquired utilization rate according to the predetermined corresponding relationship; and a first processing element, configured to open or close a core of the processor according to the determined corresponding number of the currently-running cores of the processor.

In an example embodiment, the second determining element comprises: a first determining sub-element, configured to determine the number of divided areas of a utilization rate of the processor according to the number of cores of the processor; and a second determining sub-element, configured to determine the number of running cores, corresponding to each divided area, of the processor.

In an example embodiment, the processing component comprises: a judging element, configured to judge whether the acquired utilization rate of the processor is within a predetermined utilization rate range corresponding to the number of the currently-running cores; and an executing element, configured to execute, according to a judgment result, at least one of following operations: keep the number of the currently-running cores unchanged when the judgment result is that the acquired utilization rate of the processor is within the predetermined utilization rate range; close at least one currently-working core on a premise of ensuring that at least one core works, when the judgment result is that the acquired utilization rate of the processor is not within the predetermined utilization rate range and the acquired utilization rate is lower than a lower limit of the predetermined utilization rate range; and opening at least one currently-idle core when the judgment result is that the acquired utilization rate of the processor is not within the predetermined utilization rate range and the acquired utilization rate is higher than an upper limit of the predetermined utilization rate range.

According to another aspect of the present disclosure, a terminal is provided, which may include the device according to any one of the above-mentioned contents.

By means of the present disclosure, a current utilization rate of the processor is acquired, and the number of currently-running cores of the processor is processed according to the acquired utilization rate. The problems of high device power consumption, high electric energy consumption, poor heat dissipation and the like in the related art are solved, thereby achieving the effects of improving the utilization rate of the processor, lowering the power consumption and improving the user experience.

BRIEF DESCRIPTION OF THE DRAWINGS

The drawings described here are intended to provide further understanding of the present disclosure, and form a part of the present disclosure. The schematic embodiments and descriptions of the present disclosure are intended to explain the present disclosure, and do not form improper limits to the present disclosure. In the drawings.

DETAILED DESCRIPTION OF THE EMBODIMENTS

The present disclosure is described below with reference to the drawings and the embodiments in detail. It is important to note that the embodiments of the present disclosure and the characteristics in the embodiments can be combined under the condition of no conflicts.

Figure 1:
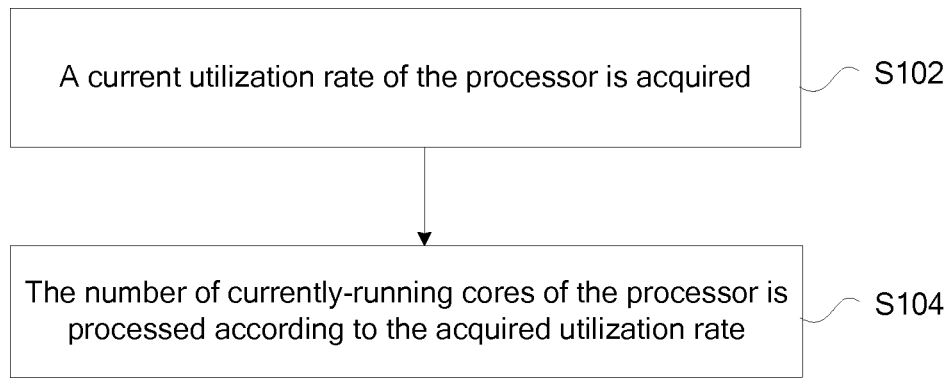
FIG. 1 is a flowchart of a method for processing a core of a processor according to an embodiment of the present disclosure.

In an embodiment, a method for processing a core of a processor is provided. FIG. 1 is a flowchart of a method for processing a core of a processor according to an embodiment of the present disclosure. As shown in FIG. 1, the flow includes the steps as follows.

Step S102: A current utilization rate of the processor is acquired.

Step S104: The number of currently-running cores of the processor is processed according to the acquired utilization rate.

By means of the steps, the number of the currently-running cores of the processor is processed according to the current utilization rate of the processor, the current utilization rate of the processor is representative of the size of a current data volume actually processed by the processor, and the number of the cores is correspondingly changed according to the size of the actually-processed data volume, so that some cores can be closed when the actually-processed data volume is small, and some cores can be opened when the actually-processed data volume is large. Compared with the related art in which the number of the cores is not changed according to the current utilization rate, the method has the advantages that the problems of high device power consumption, high electric energy consumption, poor heat dissipation and the like in the related art are solved, thereby achieving the effects of improving the utilization rate of the processor, lowering the power consumption and improving the user experience.

In other words, by adopting the processing method, the number of the currently-running cores can be optimized, namely the number of the cores reaches an appropriate value. Here, it is important to note that when the utilization rate of the processor is low, namely when there are few running programs to be processed by the processor, normal running of the processor can be completed by opening only one or two cores; and when the utilization rate of the processor is high, namely when there are many running programs to be processed by the processor, one or two cores cannot meet the normal running of the processor, it is necessary to open more cores to process the running programs at this time, the advantages of a multi-core processor can be fully played by adjusting the number of the cores according to the utilization rate of the processor, the utilization rate of a core, in an open state, inside the processor is improved, the service life of the processor is also prolonged to a certain extent, namely when part of the cores are seriously consumed so as to lose a normal running function, other cores can replace the seriously-consumed core, and a processing function of the processor is continuously completed. Particularly, it is more convenient and easier to represent the size of the actually-processed data volume of a multi-core GPU by using the utilization rate.

In an example embodiment, the step that the current utilization rate of the processor is acquired includes that: working duration of the processor within predetermined sampling duration is recorded; and a ratio of the working duration to the sampling duration is determined as the current utilization rate, wherein within the sampling duration, the working duration of the processor can be divided into multiple periods, the total working duration of the processor is obtained by cumulating all periods of the working duration, and the utilization rate of the processor is a ratio of a cumulative sum of all the periods of the working duration to the sampling time. A current usage situation of the processor can be better judged after the utilization rate of the processor is acquired, thereby providing a basis for subsequent opening or closing of the cores of the processor.

After the utilization rate of the processor is acquired, it is necessary to process the number of the currently-running cores of the processor in processing modes as follows. A predetermined corresponding relationship between a utilization rate and the number of the running cores of the processor is determined; the corresponding number of the currently-running cores of the processor is determined according to the predetermined corresponding relationship, wherein the corresponding number of the currently-running cores of the processor corresponds to the acquired utilization rate according to the predetermined corresponding relationship; and a core of the processor is opened or closed according to the determined corresponding number of the currently-running cores of the processor. The utilization rate of the processor can be effectively improved by controlling the number of the cores of the processor according to the size of the utilization rate of the processor, thereby lowering the power consumption, reducing unnecessary energy losses and prolonging the life of the processor.

In an example embodiment, the step that the predetermined corresponding relationship between the utilization rate and the number of the running cores of the processor includes that: the number of divided areas of a utilization rate of the processor is determined according to the number of cores of the processor; and the number of running cores, corresponding to each divided area, of the processor is determined. Firstly, the total number of the cores in the processor is determined, and then an appropriate number of cores are allocated for the processor with different utilization rates within each time period according to the total number. Namely, when the utilization rate of the processor is high, the number of the allocated cores will be increased, and when the utilization rate of the processor is low, the number of the allocated cores will be decreased, thereby achieving the usage effect of reasonably allocating the cores.

The step that the number of the currently-running cores of the processor is processed according to the acquired utilization rate includes that: it is judged whether the acquired utilization rate of the processor is within a predetermined utilization rate range corresponding to the number of the currently-running cores; and at least one of the following operations is executed according to a judgment result: the number of the currently-running cores is kept unchanged when the judgment result is that the acquired utilization rate of the processor is within the predetermined utilization rate range; at least one currently-working cores is closed on the premise of ensuring that at least one core works, when the judgment result is that the acquired utilization rate of the processor is not within the predetermined utilization rate range and the acquired utilization rate is lower than a lower limit of the predetermined utilization rate range; and at least one currently-idle core is opened when the judgment result is that the acquired utilization rate of the processor is not within the predetermined utilization rate range and the acquired utilization rate is higher than an upper limit of the predetermined utilization rate range. Thus, it is ensured that each core of the processor in case of a certain utilization rate is reasonably utilized. That is to say, when the utilization rate of the processor is high, some closed cores will be opened appropriately so as to increase the running cores, and when the utilization rate of the processor is low, some running cores will be closed appropriately so as to decrease the running cores, so that the situation that lots of cores run when the utilization rate of the processor is low is avoided, the utilization rate of the processor is improved, the power consumption is lowered, the usage time of the processor will be prolonged to a great extent, and the user experience is improved.

In an embodiment, a processor core processing device is also provided. The device is configured to realize the embodiment and an example implementation mode, and those which have been described are no longer described in detail. Just as a term 'component' used below, the combination of software and/or hardware with predetermined functions can be realized. Although the system described by the following embodiment is better realized by the software, the realization of the hardware or the combination of the software and the hardware may be possible and may be constructed.

Figure 2:
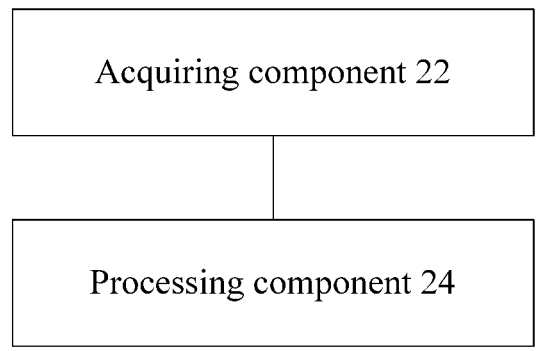
FIG. 2 is a structure block diagram of a device for processing a core of a processor according to an embodiment of the present disclosure.

FIG. 2 is a structure block diagram of a device for processing a core of a processor according to an embodiment of the present disclosure. As shown in FIG. 2, the device includes an acquiring component 22 and a processing component 24, and the device is described below.

The acquiring component 22 is configured to acquire a current utilization rate of the processor; and the processing component 24 is connected to the acquiring component 22 and is configured to process the number of currently-running cores of the processor according to the acquired utilization rate.

Figure 3:
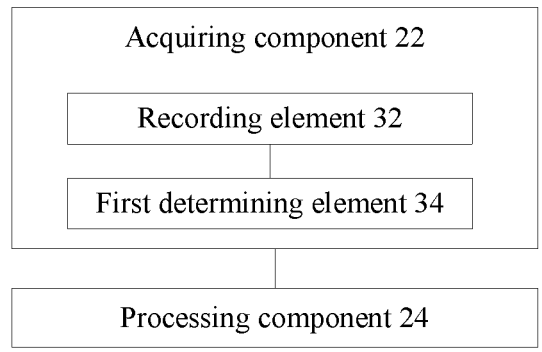
FIG. 3 is a structure block diagram of the acquiring component 22 of the device for processing the core of the processor according to an embodiment of the present disclosure.

FIG. 3 is a structure block diagram of the acquiring component 22 of the device for processing the core of the processor according to an embodiment of the present disclosure. As shown in FIG. 3, the acquiring component 22 includes a recording element 32 and a first determining element 34, and the acquiring component 22 is described below.

The recording element 32 is configured to record working duration of the processor within predetermined sampling duration; and the first determining element 34 is connected to the recording element 32 and is configured to determine a ratio of the working duration to the sampling duration as the current utilization rate.

Figure 4:
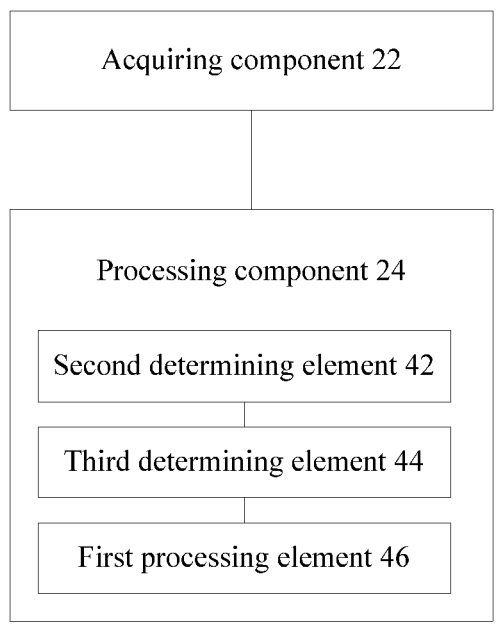
FIG. 4 is a structure block diagram 1 of the processing component 24 of the device for processing the core of the processor according to an embodiment of the present disclosure.

FIG. 4 is a structure block diagram 1 of the processing component 24 of the device for processing the core of the processor according to an embodiment of the present disclosure. As shown in FIG. 4, the processing component 24 includes a second determining element 42, a third determining element 44 and a first processing element 46, and the processing component 24 is described below.

The second determining element 42 is configured to determine a predetermined corresponding relationship between a utilization rate and the number of running cores of the processor; the third determining element 44 is connected to the second determining element 42 and is configured to determine the corresponding number of currently-running cores of the processor according to the predetermined corresponding relationship, wherein the corresponding number of the currently-running cores of the processor corresponds to the acquired utilization rate according to the predetermined corresponding relationship; and the first processing element 46 is connected to the third determining element 44 and is configured to open or close a core of the processor according to the determined corresponding number of the currently-running cores of the processor.

Figure 5:
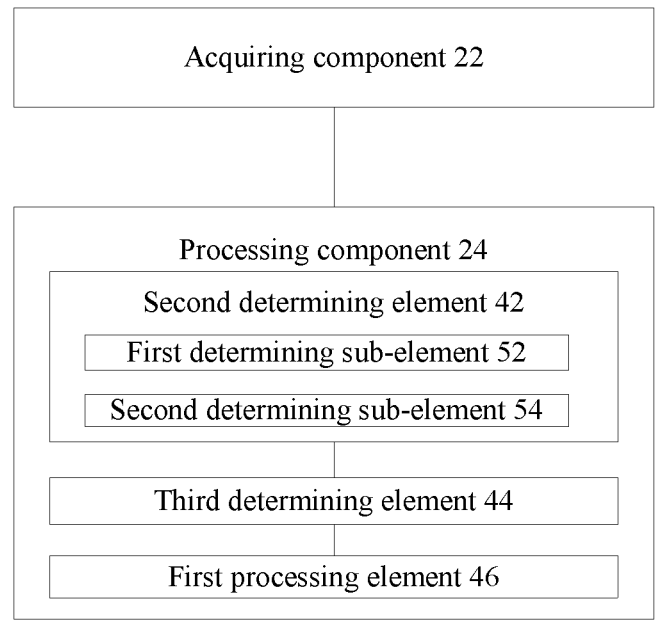
FIG. 5 is a structure block diagram of the second determining element 42 of the processing component 24 of the device for processing the core of the processor according to an embodiment of the present disclosure.

FIG. 5 is a structure block diagram of the second determining element 42 of the processing component 24 of the device for processing the core of the processor according to an embodiment of the present disclosure. The second determining element 42 includes a first determining sub-element 52 and a second determining sub-element 54, and the second determining element 42 is described below.

The first determining sub-element 52 is configured to determine the number of divided areas of the utilization rate of the processor according to the number of the cores of the processor; and the second determining sub-element 54 is connected to the first determining sub-element 52 and is configured to determine the number of running cores, corresponding to each divided area, of the processor.

Figure 6:
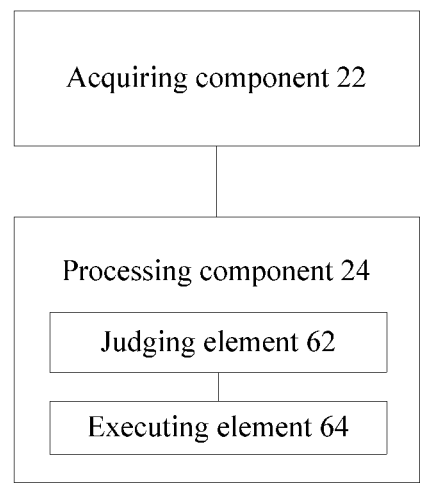
FIG. 6 is a structure block diagram 2 of the processing component 24 of the device for processing the core of the processor according to an embodiment of the present disclosure.

FIG. 6 is a structure block diagram 2 of the processing component 24 of the device for processing the core of the processor according to an embodiment of the present disclosure. As shown in FIG. 6, the processing component 24 includes a judging element 62 and an executing element 64, and the processing component 24 is described below.

The judging element 62 is configured to judge whether the acquired utilization rate of the processor is within a predetermined utilization rate range corresponding to the number of the currently-running cores; and the executing element 64 is connected to the judging element 62 and is configured to execute, according to a judgment result, at least one of following operations: keep the number of the currently-running cores unchanged when the judgment result is that the acquired utilization rate of the processor is within the predetermined utilization rate range; close at least one currently-working core on a premise of ensuring that at least one core works, when the judgment result is that the acquired utilization rate of the processor is not within the predetermined utilization rate range and the acquired utilization rate is lower than a lower limit of the predetermined utilization rate range; and opening at least one currently-idle core when the judgment result is that the acquired utilization rate of the processor is not within the predetermined utilization rate range and the acquired utilization rate is higher than an upper limit of the predetermined utilization rate range.

Figure 7:
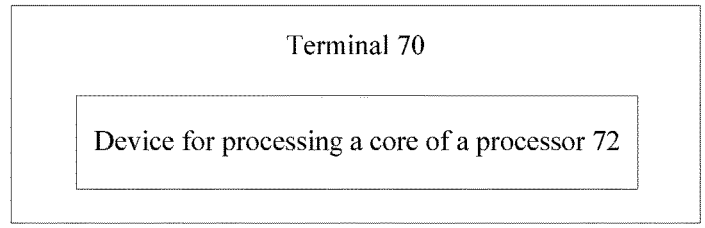
FIG. 7 shows a terminal according to an embodiment of the present disclosure.

FIG. 7 shows a terminal according to an embodiment of the present disclosure. As shown in FIG. 7, the terminal 70 includes the device 72 according to any one of the above-mentioned contents.

By means of the method for acquiring the current utilization rate of the processor and processing the number of the currently-running cores of the processor according to the acquired utilization rate, a function of opening and closing each core in the multi-core processor is realized, the problems of high device power consumption, high electric energy consumption, poor heat dissipation and the like in the related art are solved, and the effects of improving the utilization rate of the processor, lowering the power consumption and improving the user experience are achieved.

Figure 8:
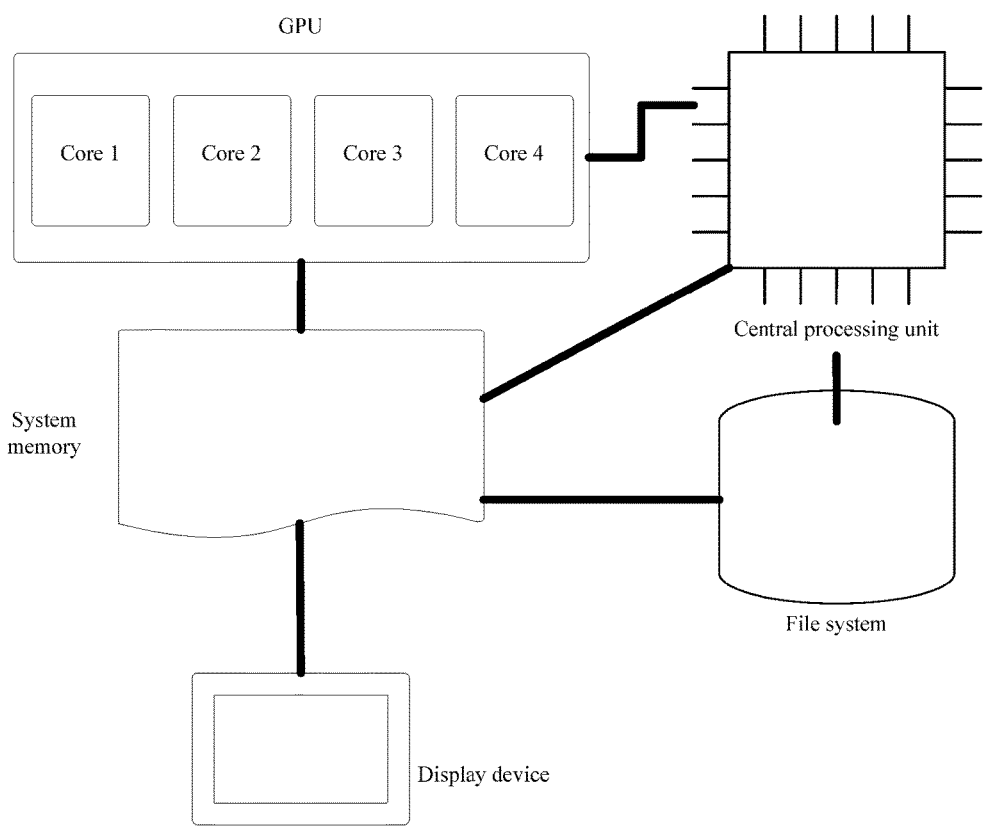
FIG. 8 is a structural diagram of relevant hardware according to an embodiment of the present disclosure.

In an embodiment of the present disclosure, a method for closing at least one core in a multi-core GPU system based on a task processing situation so as to lower the power consumption is provided, which aims at the defect in the related art that the power consumption of the device cannot be effectively reduced. Thus, the utilization rate of a multi-core GPU can be obviously improved, and the beneficial effect of lowering the power consumption is achieved. FIG. 8 is a structural diagram of relevant hardware according to an embodiment of the present disclosure. As shown in FIG. 8, the structure includes: a GPU 80, a central processing unit 82, a system memory 84, a file system 86 and a display device 88.

Figure 9:
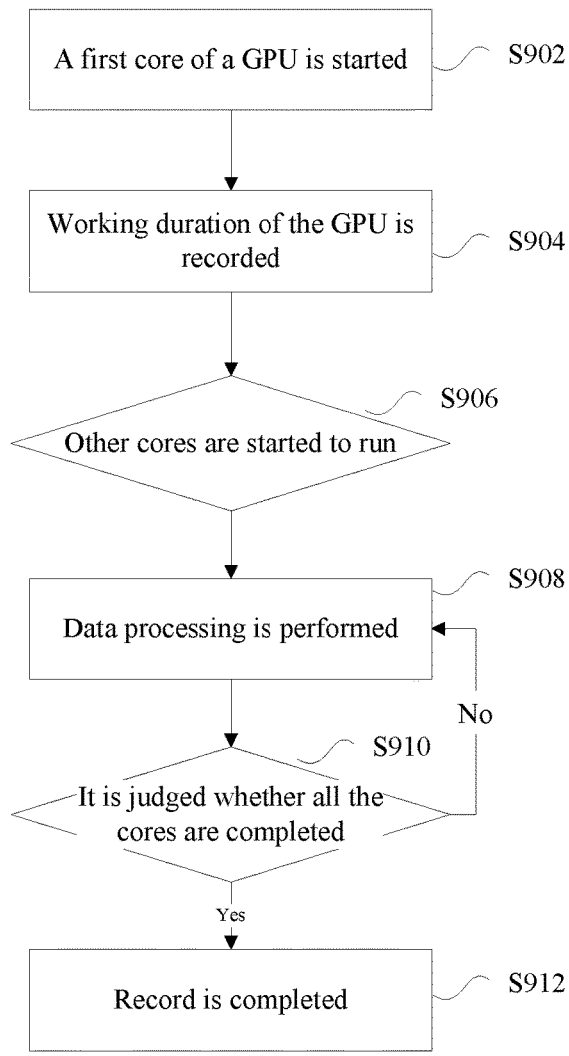
FIG. 9 is a flowchart of measurement of processing time of a GPU according to an embodiment of the present disclosure.

In the solution, at least one core in the GPU is dynamically closed according to a current data processing situation of the GPU. The solution mainly includes the steps as follows. When a system starts to run, a monitor of the GPU is arranged to calculate and check a current utilization rate of the GPU. A rule is set to calculate the current utilization rate of the GPU and a fragmentation threshold value. Multiple cores of the GPU are dynamically closed or opened according to the utilization rate of the GPU. FIG. 9 is a flowchart of processing the cores dynamically according to an embodiment of the present disclosure. As shown in FIG. 9, the flow includes the steps as follows.

Step S902: A first core of a processor is started, wherein a GPU is taken as an example to be described in the embodiment.

Step S904: Working duration of the GPU is recorded.

Step S906: It is judged whether other cores are started to run.

Step S908: Data processing is performed on all the cores which are started to run.

Step S910: It is judged whether data processing on all the cores is completed, when a judgment result is that the data processing on all the cores is completed, Step S912 is executed, and when the judgment result is that the data processing on all the cores is not completed, Step S908 is re-executed.

Step S912: Time recorded is completed.

By means of the example embodiment, the utilization rate of the GPU is directly monitored, corresponding cores in the GPU can be closed and opened in real time, and the cores in the multi-core GPU can be dynamically closed, which makes it greatly advantageous for the consumption of the electric energy of a device. The above technical solution will play an important role on reducing the power consumption of the device, thereby effectively improving the utilization rate of the GPU. For example, the power consumption of a mobile terminal device can be effectively improved. Due to the fact that there are more and more cores of the GPU in the mobile terminal device currently, a large-scale 3D application scene is increasingly complicated, and the electricity consumption is gradually increased, so that the usage of the system will effectively increase the competitiveness of a product.

The preferred implementation mode is described below with reference to the drawings.

In the preferred implementation mode, a method mainly includes the steps as follows. 1. How to measure a data processing situation of the GPU. 2. Under what situation at least one core is closed. 3. A method for closing a core of a chip.

Figure 11:
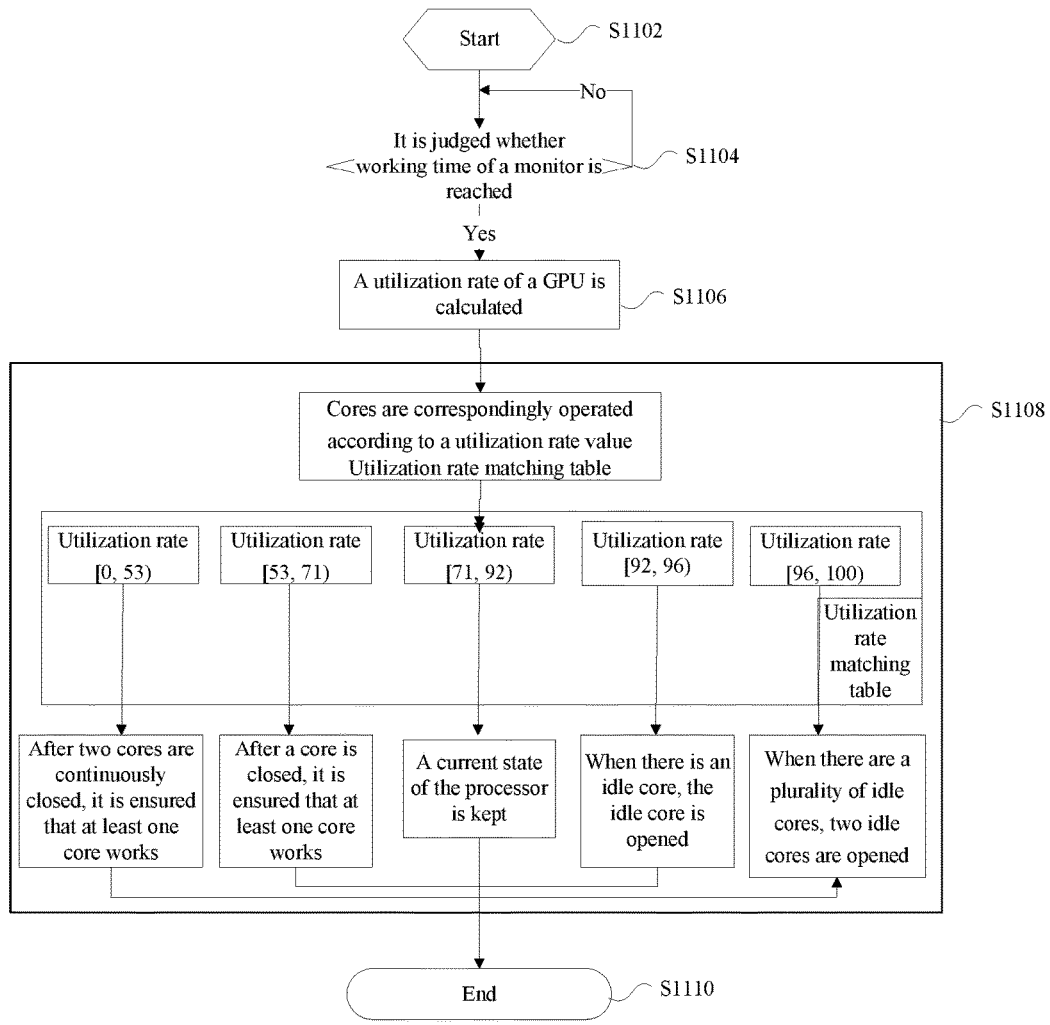
FIG. 11 is a flowchart of dynamic core operation according to an embodiment of the present disclosure.

FIG. 11 is a flowchart of dynamic core operation according to an embodiment of the present disclosure. As shown in FIG. 11, the flow includes the steps as follows.

Step S1102: START.

Step S1104: It is judged whether the working time of a monitor is reached, when a judgment result is that the working time of the monitor is reached, Step S1106 is executed, and when the judgment result is that the working time of the monitor is not reached, Step S1102 is re-executed.

Step S1106: The utilization rate of the GPU can be calculated in processing modes as follows.

Figure 10:
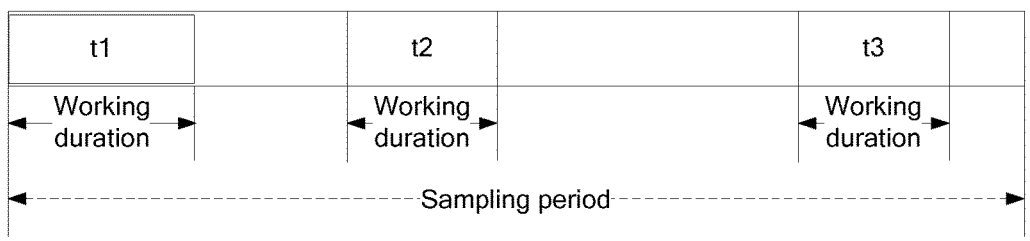
FIG. 10 is a diagram of calculation of a utilization rate of a processor according to an example implementation mode of the present disclosure.

The data processing situation is mainly measured according to the current utilization rate of the GPU. A calculation method for the utilization rate is a ratio of working duration to a specified sampling duration of the GPU. When an efficiency is expressed by a letter e, the specified sampling duration is T, and the working duration of the GPU within the time T is t1, t2, t3, ..., e=(t1+t2+t3)/T, and e ranges from 0 to 1. When the system is started, a timer (utilization_timer) of which a sampling period is T will be arranged. When the GPU starts to work, the timer is opened and triggered within T ms. Within the sampling period, the percentage of the total working duration of the GPU is the utilization rate of the GPU. FIG. 10 is a diagram of calculation of a utilization rate of a processor according to a preferred implementation mode of the present disclosure. As shown in FIG. 10, the total working duration (t1+t2+t3) is divided by the sampling period to obtain the utilization rate of the GPU.

A calculation method for the working duration is that: when the GPU starts to work in case of data processing, time measurement is started, and after all data are completely processed, time measurement is completed, wherein this period of time serves as the working duration of the GPU.

Step S1108: Cores are correspondingly operated according to a utilization rate value. For example, the following operations can be adopted.

At least one core is closed according to the proportional division of the utilization rate of the GPU. For example, when the utilization rate changes from a certain interval to another interval, core closing starts to be performed. The utilization rate is divided mainly according to the current number of the cores of the GPU. It is assumed that the GPU is a four-core GPU, the utilization rate (utilization) of the GPU is divided into five intervals, and when a new utilization is located in each interval, the number of currently-running cores of the GPU will be closed and opened correspondingly.

0<utilization<=53, two of the cores in the GPU are closed, but it must be ensured that one of the cores works;

53<utilization<=71, one of the cores in the GPU is closed, but it must be ensured that one of the cores works;

71<utilization<92, the number of the currently-running cores is stored and kept unchanged;

92<=utilization<96, when an idle core exists, the idle core in the GPU is opened; and 96<=utilization<=100, when a plurality of idle cores exist, two of the cores are opened.

Step S1110: END

It is important to note that the opening and closing of the cores in the GPU can be directly completed by reading and writing corresponding hardware switches according to the configurations of the GPU.

Obviously, those skilled in the art should understand that all components or all steps in the present disclosure can be realized by using a generic computation device, can be centralized on a single computation device or can be distributed on a network composed of a plurality of computation devices. Optionally, they can be realized by using executable program codes of the computation devices, so that they can be stored in a storage device and executed by the computation devices, the shown or described steps can be executed in a sequence different from this sequence under certain conditions, or they are manufactured into each integrated circuit component respectively, or a plurality of components or steps therein are manufactured into a single integrated circuit component. Thus, the present disclosure is not limited to combination of any specific hardware and software.

The above is only the preferred embodiments of the present disclosure, and is not intended to limit the present disclosure. There can be various modifications and variations in the present disclosure for those skilled in the art. Any modifications, equivalent replacements, improvements and the like within the spirit and principle of the present disclosure shall fall within the protection scope of the present disclosure.

To sum up, the processor core processing method and device and the terminal provided by the embodiments of the present disclosure have the following beneficial effects that: the problems of high device power consumption, high electric energy consumption, poor heat dissipation and the like in the relevant art are solved, thereby achieving the effects of improving the utilization rate of the processor, lowering the power consumption and improving the user experience.

What is claimed is:

1. A method for processing a core of a processor, comprising:
    acquiring a current utilization rate of the processor; and
    processing the number of currently-running cores of the processor according to the acquired utilization rate;
    wherein processing the number of the currently-running cores of the processor according to the acquired utilization rate comprises:
        determining a predetermined corresponding relationship between a utilization rate and the number of running cores of the processor;
        determining the corresponding number of the currently-running cores of the processor according to the predetermined corresponding relationship, wherein the corresponding number of the currently-running cores of the processor corresponds to the acquired utilization rate according to the predetermined corresponding relationship; and
        opening or closing a core of the processor according to the determined corresponding number of the currently-running cores of the processor;
    wherein determining the predetermined corresponding relationship between the utilization rate and the number of the running cores of the processor comprises:
        determining the number of divided areas of a utilization rate of the processor according to the number of cores of the processor; and
        determining the number of running cores, corresponding to each divided area, of the processor.

2. The method as claimed in claim 1, wherein acquiring the current utilization rate of the processor comprises:
    recording working duration of the processor within predetermined sampling duration; and
    determining a ratio of the working duration to the sampling duration as the current utilization rate.

3. The method as claimed in claim 1, wherein processing the number of the currently-running cores of the processor according to the acquired utilization rate comprises:
    judging whether the acquired utilization rate of the processor is within a predetermined utilization rate range corresponding to the number of the currently-running cores; and executing, according to a judgment result, at least one of following operations: keeping the number of the currently-running cores unchanged when the judgment result is that the acquired utilization rate of the processor is within the predetermined utilization rate range; closing at least one currently-working core on a premise of ensuring that at least one core works, when the judgment result is that the acquired utilization rate of the processor is not within the predetermined utilization rate range and the acquired utilization rate is lower than a lower limit of the predetermined utilization rate range; and opening at least one currently-idle core when the judgment result is that the acquired utilization rate of the processor is not within the predetermined utilization rate range and the acquired utilization rate is higher than an upper limit of the predetermined utilization rate range.

4. A device for processing a core of a processor, comprising:
a hardware processor, configured to perform programming components stored in a memory, wherein the programming components comprise:
an acquiring component, configured to acquire a current utilization rate of the processor; and
a processing component, configured to process the number of currently-running cores of the processor according to the acquired utilization rate;
wherein the processing component comprises:
a second determining element, configured to determine a predetermined corresponding relationship between a utilization rate and the number of running cores of the processor;
a third determining element, configured to determine the corresponding number of the currently-running cores of the processor according to the predetermined corresponding relationship, wherein the corresponding number of the currently-running cores of the processor corresponds to the acquired utilization rate according to the predetermined corresponding relationship; and
a first processing element, configured to open or close a core of the processor according to the determined corresponding number of the currently-running cores of the processor;
wherein the second determining element comprises:
a first determining sub-element, configured to determine the number of divided areas of a utilization rate of the processor according to the number of cores of the processor; and a second determining sub-element, configured to determine the number of running cores, corresponding to each divided area, of the processor.

5. The device as claimed in claim 4, wherein the acquiring component comprises:
a recording element, configured to record working duration of the processor within predetermined sampling duration; and
a first determining element, configured to determine a ratio of the working duration to the sampling duration as the current utilization rate.

6. The device as claimed in claim 4, wherein the processing component comprises:
a judging element, configured to judge whether the acquired utilization rate of the processor is within a predetermined utilization rate range corresponding to the number of the currently-running cores; and
an executing element, configured to execute, according to a judgment result, at least one of following operations: keep the number of the currently-running cores unchanged when the judgment result is that the acquired utilization rate of the processor is within the predetermined utilization rate range; close at least one currently-working core on a premise of ensuring that at least one core works, when the judgment result is that the acquired utilization rate of the processor is not within the predetermined utilization rate range and the acquired utilization rate is lower than a lower limit of the predetermined utilization rate range; and opening at least one currently-idle core when the judgment result is that the acquired utilization rate of the processor is not within the predetermined utilization rate range and the acquired utilization rate is higher than an upper limit of the predetermined utilization rate range.

7. A terminal, comprising:
a device for processing a core of a processor, comprising:
a hardware processor, configured to perform programming components stored in a memory, wherein the programming components comprise:
an acquiring component, configured to acquire a current utilization rate of the processor; and
a processing component, configured to process the number of currently-running cores of the processor according to the acquired utilization rate;
wherein the processing component comprises:
a second determining element, configured to determine a predetermined corresponding relationship between a utilization rate and the number of running cores of the processor;
a third determining element, configured to determine the corresponding number of the currently-running cores of the processor according to the predetermined corresponding relationship, wherein the corresponding number of the currently-running cores of the processor corresponds to the acquired utilization rate according to the predetermined corresponding relationship; and
a first processing element, configured to open or close a core of the processor according to the determined corresponding number of the currently-running cores of the processor;
wherein the second determining element comprises:
a first determining sub-element, configured to determine the number of divided areas of a utilization rate of the processor according to the number of cores of the processor; and a second determining sub-element, configured to determine the number of running cores, corresponding to each divided area, of the processor.

* * * * *